(12) United States Patent
Chan et al.

(10) Patent No.: US 7,142,121 B2
(45) Date of Patent: *Nov. 28, 2006

(54) RADIO FREQUENCY DEVICE FOR TRACKING GOODS

(75) Inventors: Benson Chan, Vestal, NY (US); William Kimler, Vestal, NY (US); How Lin, Vestal, NY (US); William Maines, Binghamton, NY (US); Voya Markovich, Endwell, NY (US)

(73) Assignee: Endicott Interconnect Technologies, Inc., Endicott, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 107 days.

(21) Appl. No.: 10/860,071

(22) Filed: Jun. 4, 2004

(65) Prior Publication Data

US 2005/0270160 A1 Dec. 8, 2005

(51) Int. Cl.
*G08B 13/14* (2006.01)
(52) U.S. Cl. .............................. 340/572.8; 340/572.9; 340/572.7; 235/385; 257/678
(58) Field of Classification Search ............. 340/572.7, 340/572.8, 572.9; 235/492, 385
See application file for complete search history.

(56) References Cited

U.S. PATENT DOCUMENTS

| | | | |
|---|---|---|---|
| 4,744,939 A | 5/1988 | Gold et al. | |
| 4,831,539 A | 5/1989 | Hagenbuch | |
| 4,901,933 A | 2/1990 | Crites | |
| 5,304,786 A | 4/1994 | Pavlidis et al. | |
| 5,565,324 A | 10/1996 | Still et al. | |
| 5,721,099 A | 2/1998 | Still et al. | |
| 5,777,553 A * | 7/1998 | Perreau et al. | 340/551 |
| 6,130,613 A * | 10/2000 | Eberhardt et al. | 340/572.7 |
| 6,169,974 B1 | 1/2001 | Baumgartner et al. | |

(Continued)

FOREIGN PATENT DOCUMENTS

WO 95/29437 9/2006

OTHER PUBLICATIONS

"Encoding methods for combinatorial chemistry", Current Opinion in Chemical Biology, 1997, 1:60-66.

(Continued)

*Primary Examiner*—Jeffery Hofsass
*Assistant Examiner*—Hongmin Fan
(74) *Attorney, Agent, or Firm*—Hinman, Howard & Kattell, LLP; Lawrence R. Fraley

(57) ABSTRACT

A radio frequency (RF) device (or "tag") for containing specific information relating to a particular good being shipped from one location (e.g., warehouse) to another (e.g., customer). The device includes a circuitized substrate (e.g., a printed circuit board), a semiconductor chip, an antenna and a power regulator, and is designed in one embodiment to be partly inserted within a good (e.g., a cardboard box) containing one or more of the goods being shipped and tracked. Alternatively, the device may be attached by other means (e.g., adhesive). A shipper can simply track the goods containing such devices using wireless communication devices (e.g., satellites) to quickly and readily ascertain the specific location of the goods at any time as well as the appropriate desired information relating to such goods (e.g., quantity, weight, type, etc.).

8 Claims, 3 Drawing Sheets

U.S. PATENT DOCUMENTS

| | | |
|---|---|---|
| 6,445,810 B1 | 9/2002 | Darrell et al. |
| 6,506,342 B1 | 1/2003 | Frankel |
| 6,510,799 B1 | 1/2003 | Lamb et al. |
| 6,594,692 B1 | 7/2003 | Reisman |
| 6,617,583 B1 | 9/2003 | Bawendi et al. |
| 2001/0020896 A1* | 9/2001 | Higuchi .................... 340/572.7 |
| 2001/0035822 A1* | 11/2001 | Seidel ..................... 340/572.8 |
| 2003/0189491 A1* | 10/2003 | Ng .......................... 340/572.9 |
| 2005/0242957 A1* | 11/2005 | Lindsay et al. .......... 340/572.7 |

OTHER PUBLICATIONS

"Radiofrequency Encoded Combinatorial Chemistry", Nicolaou et al, Angew Chem. Int. Ed. Engl. 1995, 34, No. 20, pp. 2289-2291.

"Tagging in combinatorial chemistry: the use of coloured and fluorescent beads", Chem. Commun., 1997, 735-736.

* cited by examiner

RADIO FREQUENCY DEVICE FOR TRACKING GOODS

CROSS REFERENCE TO CO-PENDING APPLICATION

In Ser. No. 10/860,067, filed Jun. 4, 2004, entitled "METHOD AND SYSTEM FOR TRACKING GOODS" (Inventors: B. Chan et al), there is defined method and system for tracking goods, etc., food products, which involves identifying the received goods at a specified location and thereafter assigning an encoded readable code to each of the goods which can be only accessed by authorized personnel responsible for handling the goods on through to and including shipment, e.g., to customers. A host computer includes a database for encoding received identification data and thereafter encoding same to provide the readable codes. The method and system also allows the customer/recipient to access the codes to discern whether he/she has received the correct goods purchased.

TECHNICAL FIELD

The invention relates to the tracking of various goods such as food products. More particularly, the invention relates to a device for effectively tracking goods as part of a receiving and distribution process such as defined in the aforementioned pending application where the goods are received within a common location such as a warehouse and then shipped to designated customer locations distant from the warehouse.

BACKGROUND OF THE INVENTION

It is imperative in today's highly competitive commercial environment that products reach the marketplace quickly and efficiently. This is especially important for products such as food products, particularly when such products are of the perishable variety. With due consideration to today's security-conscious environment, it is also imperative that such products are assured safe and secure transport to the final destinations thereof, such that tampering and theft are effectively prevented. Finally, it is imperative that effective accountability of each product in the distribution process occur, to assure that the end customer receives and pays for the correct goods he/she has purchased.

The invention defined herein is useful for tracking other goods than simply food products, and is thus not limited thereto. The teachings herein are equally applicable to receiving and distribution of all sorts of goods, including electronic packaging components (e.g., printed circuit boards and cards, chip carriers, etc.), electronic components (e.g., computers, servers, etc.), and a multitude of others of many different sizes and shapes. As defined herein, the invention is also applicable to effective receipt and distribution of both large and small quantities of such goods, and of goods of many different cost levels.

Tracking and identifying quantities of goods during a storage and/or distribution process has presented a significant challenge for both industry and science. For example, the demands of keeping track of consumer products, such as food products, jewelry, and the like, and the strong interest in effective identification devices (perhaps the most classic today being credit/debit cards with personal photo identification thereon), has led to the need for a secure, relatively fast, yet readily inexpensive to operate, tracking system such as taught in the aforementioned pending application. Additionally, emerging technologies such as combinatorial chemistry, genomics research, and microfluidics also require the ability to identify and track the location of large numbers of items, especially in the science industry and other industries shipping goods such as chemicals, powders, and the like.

A well known procedure for tracking the location and/or identity of goods is the utilization of Universal Product Code (UPC) technology, or, as also known, "barcode" technology. Barcodes use a linear array of elements that are either printed directly on goods or on labels that are affixed to the goods, typically in the form of a decal or the like (some of more recent vintage are printed as part of the package container). These barcode elements typically comprise bars and spaces, with bars of varying widths representing strings of binary "ones" and spaces of varying widths representing strings of binary "zeros". Barcodes can be detectable optically using devices such as scanning laser beams or handheld wands, or these can be implemented in magnetic media. The readers and scanning systems electro-optically decode the symbol to multiple alpha-numerical characters that are intended to be descriptive of the article or some characteristic thereof. Such characters are typically represented in digital form as an input to a data processing system for applications such as in point-of-sale processing and inventory control, these latter two being only examples of many such applications. Traditional barcodes usually contain 15 or less digits but are not limited to this number if the length of the overall label allows more to be used. However, two dimensional bar codes have also been developed in which one-dimensional bar codes are stacked with horizontal guard bars between these to increase the information density. For example, U.S. Pat. No. 5,304,786 describes the use of a high density two-dimensional bar code symbol for use in bar code applications.

A different form or technology that has been developed for labeling objects includes a composition comprising silicon or silicon dioxide microparticles and a powder, fluid or gas to be applied to goods such as vehicles, credit cards and jewelry (see foreign patent WO 95/29437 for a description of such usage). This system typically allows the formation of several million particles on a single wafer, each of the particles on one wafer being designed to be of identical shape and size so that when the particles are freed from the wafer substrate one is left with a suspension containing a single particle type which can thus be identified and associated with a particular item (good).

Still another, yet more recent, technology is combinatorial chemistry which has also resulted in the development of various encoding schemes (See, for example, Czarnik, A. W., "Encoding Methods for Combinatorial Chemistry", Curr. Opin. Chem. Biol., 1997, 1, 60). The need for this development has arisen in part from the split and pool technique utilized in combinatorial chemistry to generate libraries on the order of one million compounds. Split and pool synthesis involves dividing a collection in beads into N groups, where N represents the number of different reagents being used in a particular reaction stage, and after the reaction is performed, pooling all of these groups together and repeating the split and pool process until the desired reaction sequence is completed. Clearly, in order to keep track of each of the compounds produced from a reaction series, the beads must be "tagged" or encoded with information at each stage to enable identification of the compound of interest or the reaction pathway producing the compound. The tags used to encode the information, however, must be robust to the conditions being employed in the chemical synthesis and must be easily identifiable to obtain the information. Exemplary encoding techniques that have been developed include the use of chemically robust small organic molecules ("tags") that are cleaved from the bead after the synthesis is completed and analyzed using mass spectroscopy (see U.S. Pat. Nos. 5,565,324 and 5,721,099 for descriptions of this technology). Radio frequency (RF) encoded combinatorial chemistry is also known and combines recent advances in microelectronics, sensors, and chemistry and uses a single or multiple addressable radiofrequency tag semiconductor unit to record encoding and other relevant information along the synthetic pathway (Nicolaou et al, *Angew. Chem. Int. Ed. Engl.* 1995, 34, 2289).

Still another example of on-bead decoding includes the use of colored and fluorescent beads (Egner et al., *Chem. Commun.* 1997, 735), in which a confocal microscope laser system is used to obtain the fluorescence spectra of fluorescent dyes.

As understood from the following, the present invention provides a new and unique device which utilizes RF identification to track goods, including those of the several different types mentioned hereinabove, and others. The device as defined herein is of relatively simple yet robust construction, may be reusable, and can be operated expeditiously at relatively low cost to assure safe, efficient and secure shipment such that a receiver of the desired goods will know he/she is receiving exactly the type and quantity of goods he/she has requested.

It is believed that such a device will constitute a significant advancement in the art.

OBJECTS AND SUMMARY OF THE INVENTION

It is, therefore, a primary object of this invention to provide a new and unique tracking device which assures safe, efficient and fast tracking of goods being shipped such as by conventional means, e.g., by known air, land or sea transport.

It is another object of the invention to provide such a device which utilizes RF technology and which can be operated expeditiously and at relatively low cost.

It is yet another aspect of the invention to provide such a device which is particularly adaptable for utilization with the system defined in the above pending patent application.

According to one aspect of the invention, there is provided an RF device for tracking goods, the device comprising a circuitized substrate, at least one semiconductor chip electrically coupled to the circuitized substrate, an antenna electrically coupled to the circuitized substrate, and a cover for substantially covering the semiconductor chip. The RF device is adapted for being securely positioned on a good for being shipped.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings. It is understood that like numerals will be used to indicate like elements from FIG. to FIG.

The method and system defined in the aforementioned pending patent application Ser. No. 10/860,067 is designed for quickly and efficiently tracking goods of many different types such that these goods are properly received by a designated location such as a warehouse or the like and thereafter correctly distributed (transported) to designated recipients such as customers so that these customers are assured reception of the proper goods they purchased. A key aspect of this method and system involves the assigning of encoded readable codes for the receiving goods following identification thereof at receipt such that only authorized personnel will have access to such readable codes in order to correctly discern the contents thereof. As explained, it is also possible within the scope of this method and system to allow recipients/customers to have access to codes in order to be assured they receive the goods they ordered. The method and system is workable for all kinds of goods, from perishable food products to chemical and powder materials held in adequate containers. This method and system uses known technologies for the most part and are thus relatively easy to operate and relatively inexpensive to build and maintain. These are also adaptable in an environment where the goods are received and then shipped to the designated recipients or, alternatively, where the goods are temporarily stored after receipt and before shipment. Effective tracking from receipt to storage (optional) to shipment and finally to the recipient is thus possible using the unique teachings of this method and system.

Figure 1:
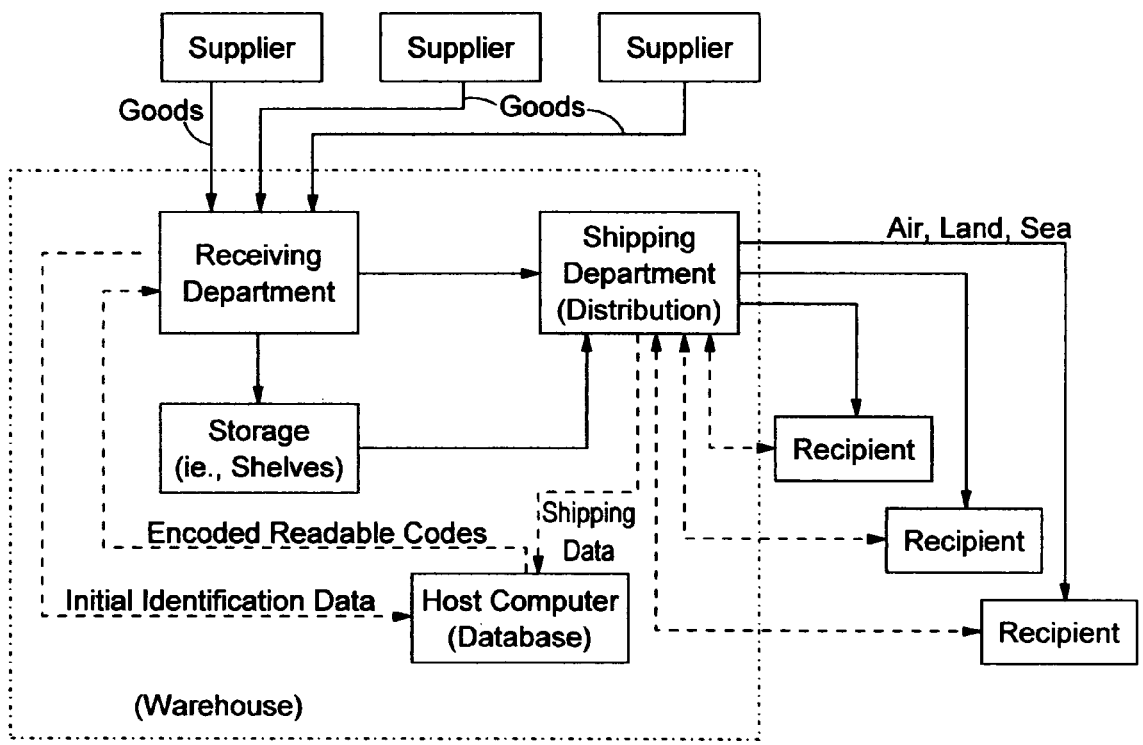
FIG. 1 illustrates a system for tracking goods during a receiving and distribution process as defined in the aforementioned pending patent application.

The system of Ser. No. 10/860,067, as seen in FIG. 1, initially involves the receipt of goods from designated suppliers (three shown in the) into the receiving location (typically a receiving department or the like) of a specified location, one prime example being a warehouse facility or the like. The system is adapted for tracking and distributing received goods having already provided thereon appropriate indicia such as the aforementioned bar codes (except when the method and system utilizes the RF devices of the instant invention, should it be desirable to utilize same on such incoming packages) which identify the goods according to a particular characteristic. Examples of such particular characteristics include the type of goods, the number of goods (e.g., within a single container such as a box), the weight and/or total volume, etc. It is not necessary, however, that such goods be already identified in such a manner upon receipt. If such indicia is not provided, one of the initial steps involves identifying these goods in accordance with such characteristics for further providing such information to a host computer database. To accomplish this, the incoming goods may be scanned, utilizing standard scanners, preferably of the hand-held variety. These scanners may read bar codes if provided or be programmed to detect and read other characteristics such as mentioned above. As defined hereinbelow, the present invention provides an alternative approach to such reading and identification of the goods, that being the use of a radio frequency (RF) device which includes a program therein specifically providing desired characteristics for each good incoming. Further description and operation of this device is provided below, particularly with the description of FIGS. 2–5. Goods identification may also include weighing of the goods if this particular characteristic is desired (as it most likely will be). Thus, a combination of many devices taught herein may be used in Ser. No. 10/860,067 to provide goods identification to assure the correct characteristics required. After obtaining these particular characteristics, as stated, these are provided to the host computer database and retained there in accordance with a program established for this purpose. It is to be understood that the instant invention is also readily capable of being utilized with several different types of systems and methods than those defined in the aforementioned pending patent application. The invention is not to be limited in scope to such utilization.

In addition to the goods characteristics, the information provided to the database may also include the identification of the person or persons receiving the goods to thus assure greater security thereof (e.g., to deter the opportunity for theft or to assure accountability for subsequent misplacement).

The next step in tracking the goods using the system of FIG. 1 is a very important one, and involves the encryption (encoding) of the identification information in the database and thereafter providing a unique, encoded readable code for each of the goods received. This encryption and code provision may be accomplished utilizing conventional software or through utilization of a developed program, which may be developed utilizing skills known in the art. The encoded information is also stored within the computer database for future reference and possible modification (if desired).

As mentioned above, the system in FIG. 1 is adaptable for use in a warehouse or the like situation in which storage is possible or, alternatively, where subsequent distribution (shipping) of the goods is desired without such storage. FIG. 1 illustrates both possibilities, showing the goods as being directly moved (e.g., using a forklift truck) to suitable storage (e.g., shelving or the like), or directly to a shipping location (department) for subsequent shipping (distribution) to designated recipients. In the case of perishable items such as certain food products, it may be desirable to immediately ship these goods rather than store same, but it is also within the scope of the system to provide such storage (e.g., in suitable cold storage such as freezers). Expiration date information can be entered into the storage system manually or can be provided as part of the RF identification system incoming from various goods suppliers. This data can then be used to determine which goods are to be shipped first. In either case, before moving from the receiving location, the goods are provided with the encrypted information using the RF device taught herein. As stated, this is preferably manually applied by a human receiver upon receiving the respective goods information from the host computer.

If the goods are to be stored, each of the storage shelves of the system of FIG. 1 may include a unique identification code attached thereto such that when a particular good is stored thereon, this unique identification information, together with the encrypted information on the respective goods (and, again, possibly the identification of the person handling these goods) is transmitted to the host computer for corresponding database updating. The precise location of any one set of goods within the warehouse is thus readily discernible by accessing the database, e.g., from a monitor or the like at an appropriate location within the warehouse storage location. Hand-held transmitters-receivers are also usable for this purpose. It is understood that if the goods are shipped directly from the receiving location to shipping, these will only contain the encoded readable coded information thereon, including, again, the possible identification of the respective handler transporting these goods from receiving to the shipping location (e.g., shipping department or dock).

In order to fill an order for goods held in storage, the order filler utilizing the system of FIG. 1 (and Ser. No. 10/860,067) will determine the location of the goods according to the information provided by the host computer and transport these to the shipping location, also sending the host computer his own biometric data (identification) if required. The host computer now knows the person handling the goods, and all important characteristics thereof such as quantity, type, weight, volume, etc. Once the goods reach the shipping location, receivers at the location also input their own biometric data to the host computer, along with the goods data. The computer now knows that the goods are no longer in storage but awaiting shipment. When the goods are placed on the selected means of transportation (e.g., a truck), the encoded readable codes of each are read once again, and other identification (that of the trucker) is forwarded to the host computer. In FIG. 1, this is shown as "shipping data". It is also within the scope of this invention that the shipper have his/her own access to the host computer database to be assured that he/she is receiving the precise quantity and type of goods he/she is now responsible for transporting. Once confirmation is attained, shipment (distribution) is now possible.

FIG. 1 indicates that air, land or sea transportation are possible for the goods now including the designated shipping data. Examples are airplane, truck and ship, respectively. The system of FIG. 1 is readily adaptable for all such means of transportation. This system is not limited to just these three particular elements (airplane, truck or ship) as others are possible (e.g., railroad cars).

To assure still further precise tracking of these goods, it is also possible to provide a generated code for the transporting vehicle using the RF device of the instant invention so that the information contained in this device can be read at designated locations distant from the warehouse to assure proper and timely distribution in accordance with the most efficient channels. For example, an RF transmitter-reader could be positioned at a specified location distant from the warehouse to assure that a particular vehicle (e.g., a truck) passed thereby within an appropriate time period from departure, thus also assuring that the vehicle is on the correct and most efficient route to the ultimate recipient. Should deviations from these desired readings occur, corrective action may be promptly taken, including contacting the transporter (if possible) or appropriate law enforcement agencies (should theft be deemed to have occurred).

Once the goods are distributed to the respective recipients 19 in the system of FIG. 1, it is possible to provide each of these recipients with access to the host computer database, and particularly the information therein pertaining to the shipped orders. In FIG. 1, access is shown (in dotted line) between the shipping department and recipient and this is understood to mean that the recipient is accessing information at the shipping department which in turn has received the appropriate information from the host computer database. It is also within the scope of the invention to have the recipients directly access the database, this perhaps being a more efficient means should it not be desirable to involve shipping personnel or the like and there are appropriate personnel serving the host database capable of doing so. Each recipient will thus access information from the computer to obtain the necessary coded information for the goods, the biometric identification information of the respective transporter who brought the goods to the recipient's location, and the encoded information in the RF device as taught herein (which is attached to the respective item (good) being shipped). In reality, it is most likely that several RF devices of the type taught herein will be utilized per shipment due to the likelihood of many different items or containers of same being shipped simultaneously to an individual recipient. This thus assures that the correct transporter is transporting the goods in question and that the goods are identical to those which left the shipping department destined for said recipient. This is especially important for security reasons, e.g., to assure tampering or theft has not occurred. The goods in such a situation are preferably locked within the transporting apparatus and can provide further means of protection in addition to those also described herein.

In accordance with the teachings of the present invention, and as stated above, an enhanced means of assuring positive tracking of the respective goods through the process is provided herein and illustrated in FIGS. 2–5. This invention involves the use of RF transmission and reception devices. As such, appropriate RF identifiable codes are used and secured to each of the goods being tracked. That is, a programmed RF device (or "tag") is attached to the goods at receipt and subsequently used throughout the system, including having this device updated with the aforementioned information at various parts of the process. Reading of the respective tags may be accomplished by a human being using a portable computer with voice command capabilities along with a low power radio frequency reader. The human user can update the "tag" (which includes a programmed semiconductor chip (39) as part thereof) with his/her own biometric information, the chosen storage shelf location, etc. The tag can also be updated with the shipping department information and that of the chosen carrier. The use of RF tags and associated hardware (e.g., satellite and cell phone connections) is desirable due to the enhanced capabilities of such advanced technologies. Each RF device, as defined in greater detail hereinbelow, is of relatively simple "button" or "tag" form and pressed onto or pinned into the individual goods (e.g., if a relatively large, hard surfaced item), a container having a specified quantity of such goods therein, etc. The device also includes an antenna for receiving RF energy necessary to effectively operate the process, such as energy from a hand-held RF reader-transmitter. That is, the antenna on the RF device is designed to capture this RF energy and convert it to electrical energy to power the chip.

Figure 2:
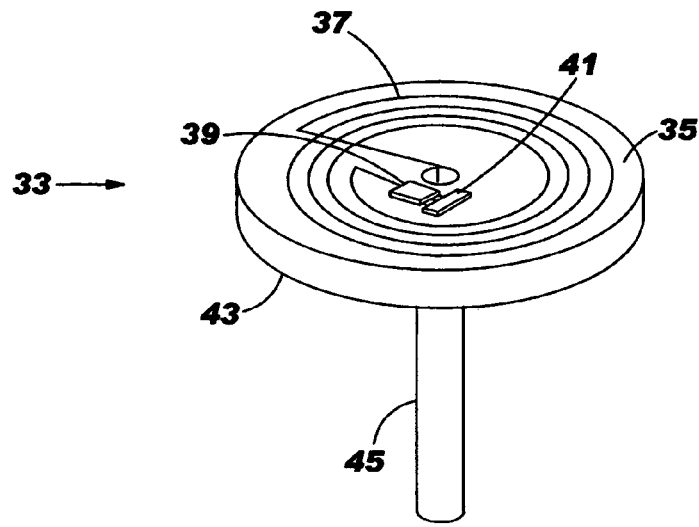
FIG. 2 is a perspective view, on an enlarged scale, of part of a tracking device according to one embodiment of the invention.
Figure 3:
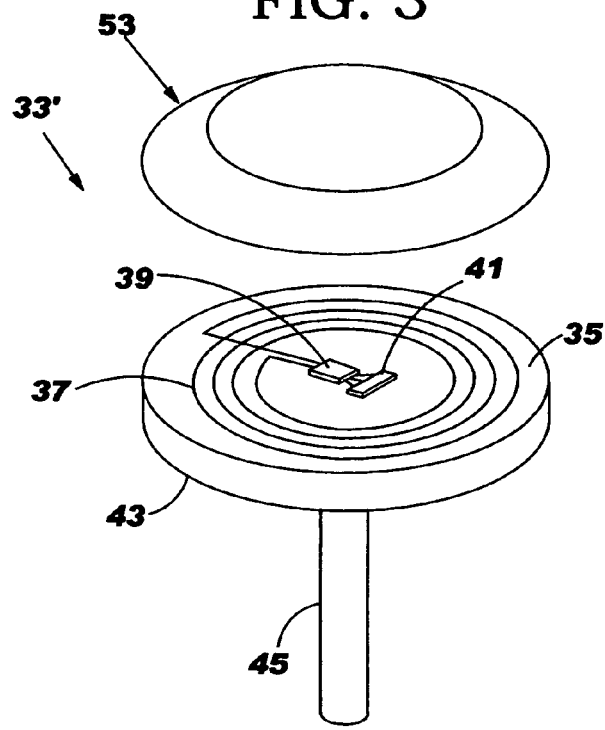
FIG. 3 is an exploded perspective view, also on an enlarged scale, of a completed device of a different embodiment to that illustrated in FIG. 2.

In FIG. 2, there is shown an RF device 33 according to one embodiment of the invention. Notably, FIG. 3 represents a somewhat similar, albeit slightly different embodiment of the invention, and is referenced by the numeral 33'. Reference will thus be made to both FIGS. simultaneously for ease of description. The devices in FIGS. 2 and 3 each include a circuitized substrate 35 which, in a preferred embodiment of the invention, is of annular (circular) configuration and preferably a printed circuit board made of conventional materials. Located on the upper surface of substrate 35 is an antenna 37 which, as shown, includes a plurality of individual circular (or spiral) loops located about a peripheral portion of the substrate and having two ends coupled back to a semiconductor chip 39. Chip 39 is positioned on substrate 35 and electrically coupled to antenna 37, as shown. Chip 39 is designed for being programmed to the appropriate frequencies needed to operate these devices of FIGS. 2 and 3 and for being programmed to include the desired information stated above with respect to the particular good or goods associated with the invention. Power regulation for the invention in FIGS. 2 and 3 is controlled by a power regulator 41 which, as shown, is positioned on substrate 35 immediately adjacent chip 39. The power regulator 41 functions as follows. When an RF device of the invention is in relative close proximity to an RF reader or RF programmer (which transmits RF signals), the power regulator will be activated and begin monitoring and collecting electromagnetic energy picked up by antenna 37. Once the power regulator determines sufficient coupled energy is available, it will supply power to chip 39, resulting in the chip initiating the desired transaction.

Figure 4:
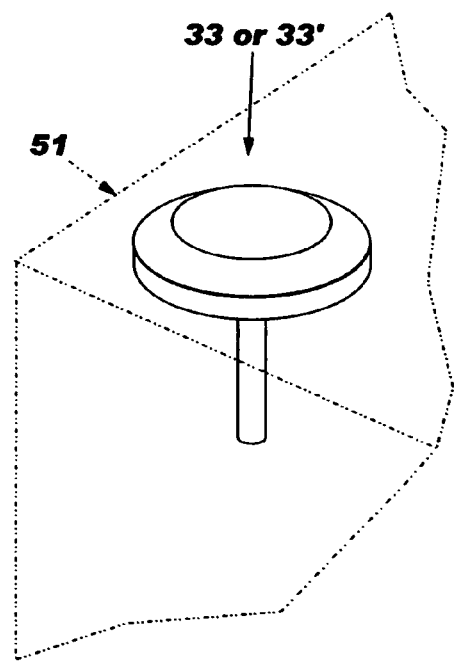
FIG. 4 is a perspective view, on a much smaller scale than FIGS. 2 and 3, illustrating an assembled device in accordance with one embodiment of the invention.

In a preferred embodiment, each device 33 and 33' further includes a body portion 43 of substantially annular, cylindrical configuration and designed for having the also annular circuitized substrate 35 positioned substantially therein (as shown). Body portion 43 is preferably comprised of an engineering plastic material such a Lexan, PPS or Vectra so as to eliminate RF interference. Body portion 43, in the embodiments of FIGS. 2–4, further includes a protruding end segment 45, which, in a preferred embodiment, is metallic (e.g., stainless steel) which projects downwardly from body portion 43 to thus form a "pin" type extension. Although segment 45 is shown as substantially cylindrical in FIGS. 2 and 3, it is possible to taper the protruding end for ease of insertion of body portion 43 within a suitable (e.g., cardboard) container, such as represented by the numeral 51 in FIG. 4. (Segment 45 is preferably of metal to facilitate this positioning as well.) Container 51 is shown in phantom in FIG. 4 for illustration purposes. The RF device 33 (or 33') is shown in FIG. 4 as being inserted within the container, such insertion easily made possible by manual means such as by a shipper or other person responsible for handling the container (or good) being shipped and tracked. In the embodiments of FIGS. 2 and 3, the antenna, chip and power regulator are mounted on the planar upper surface of substrate 35. To cover these structures, a cover 53 may be used, the cover preferably of the aforementioned engineering plastic material. Cover 53 is shown only in FIG. 3, but is also utilized in the FIG. 2 embodiment for the same purpose. Cover 53, like body portion 43, is plastic or similar material to facilitate programming chip 39 using wireless means; that is, to prevent interference of the incoming RF energy generated by the described hand-held RF readers being operated by the warehouse personnel responsible for the goods in transit.

Significantly, the invention as taught herein is capable of being re-programmed following the provision of an initial program for a first set of goods or a singular good being shipped, the chip thus being re-programmed following usage of the invention and return thereof to the original shipping location such that additional goods may be also tagged with this same device. The re-programming of the device is preferably protected by appropriate means to prevent stray RF energy such as might be present in the warehouse (e.g., if other RF components are being utilized) from deleting or otherwise altering already programmed information, as well as preventing un-authorized access to the device. Such means are within the scope of one skilled in the art and further description is thus not considered necessary.

Figure 5:
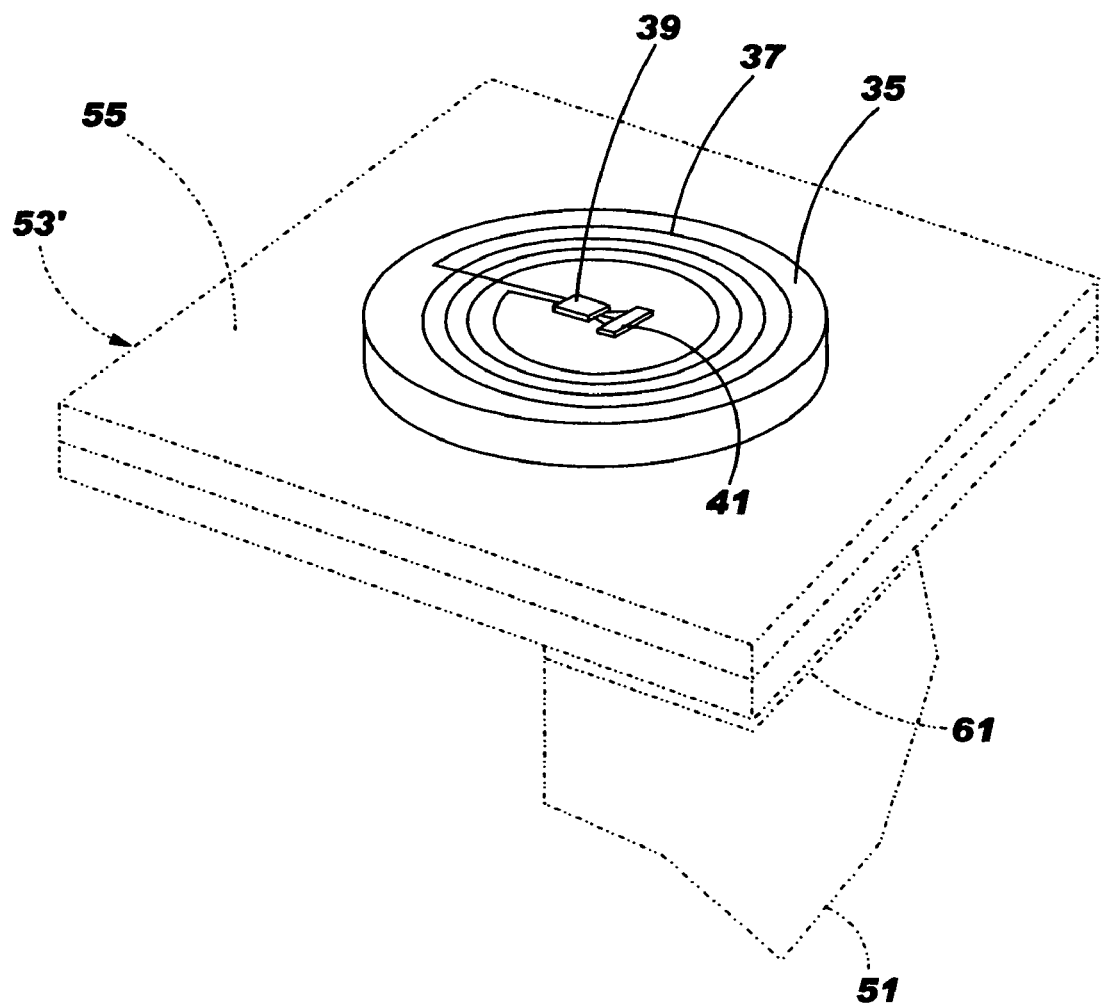
FIG. 5 is a perspective view, also on an enlarged scale, of a tracking device according to another embodiment of the invention.

FIG. 5 represents an alternative embodiment to the invention, in that the desired cover, now illustrated by the numeral 53' and shown in phantom, comprises a housing 55 which is preferably in the form of a flexible transparent or similar material (e.g., the plastic materials mentioned above for body portion 43 and cover 53) so as to form an "envelope" about the circuitized substrate 35 having the chip 39, antenna 37 and power regulator 41 thereon. In the embodiment of FIG. 5, the metallic metal portion 43 shown in FIGS. 2 and 3 is not necessary but may be utilized, e.g., for strength purposes. The housing 55 is thus in the form of a label or the like which can then be secured to a package 51 (phantom), preferably utilizing an adhesive 61 (also in phantom). Adhesive 61 can be of the conventional type desired for holding labels or the like on packages and further description is not believed necessary. Significantly, if the device in FIG. 5 is intended to be re-usable as are the devices in FIGS. 2 and 3, then additional layers of adhesive may be necessary to secure the label-blank housing 55 to subsequent, different packages containing goods for tracking. The RF device in this embodiment can be similar in shape to a standard, thin "credit card" sized container that will not interfere with the stacking of other, similarly labeled containers holding the goods being stored and/or during shipment thereof.

As an alternative cover for cover 53 in FIGS. 2 and 3, it is possible to utilize a conventional "glob top" dielectric material conventionally used in many printed circuit board operations to cover circuitry on circuit boards. Such "glob top" or encapsulant material is known in different compositions and forms a relatively solid shape once finally cured in position. Further description is not considered necessary.

The following is a more detailed example of how the invention may be preferably utilized in a goods tracking scenario. Goods are received from various suppliers to a central warehouse, as illustrated in FIG. 1. These goods may or may not have RF devices thereon. If not installed, these goods will be provided an RF device which will be attached in accordance with the teachings herein. A singular device may be utilized for a container having multiple units of goods therein or attached to each of the goods, depending on designated shipping requirements. For example, each of the goods may be verified for type, quantity and weight, in addition to being identified with a specific date of receipt in the warehouse and/or shelf life of the goods. This information is then programmed onto the RF devices and also sent to the host computer database shown in FIG. 1, if this system is being utilized. If storage is desired, the goods are then placed in storage and properly identified with respect to the selected locations (e.g., shelving) of the warehouse. To facilitate this operation, separate RF devices are also provided for each of the storage locations with the information therein also provided the host computer.

When an order for selected goods is received at the warehouse, the warehouse operator (hereinafter "picker") will receive an order sheet or the like defining the type and quantity of goods needed to fulfill the order. The picker will preferably have (including possibly wear) a portable computer with voice command capabilities along with a low power RF reader. Further, the order sheet provided the picker will preferably also include an optimized routing path to enhance the route traveled by the picker to the selected goods. Once the picker accesses the portable computer, he/she is able to ascertain which location of storage he/she needs to reach to satisfy the order. The picker reads the RF device on the stored goods at this location (having also confirmed the location with the RF device positioned at this location) to tie the order to the desired goods. At the time of selection, the picker can also determine if a particular product has exceeded its shelf life to thus assure that a proper selection is being made. If, for example, the shelf life has been exceeded, the computer in turn will advise the picker, a substitute quantity of goods will be identified, and the operator(s) of the system will know it is time to replace the outdated goods.

Once the total, acceptable goods are "picked" (selected), the picker then takes the goods to the shipping department location which in turn will preferably have a series of RF readers to also read the information for each of the goods entering the shipping location. If these goods match the order, this information is provided the host computer and the goods are loaded onto delivery means (e.g., trucks) for delivery to the desired recipients. To further expand the invention, it is also possible to provide the respective shipping personnel (e.g., a trucker) with an RF reader such that this person can confirm he/she is receiving the specified goods for shipping. The shipper may in turn compare these goods to the information previously provided the host computer by the picker and the shipping department. Still further expansion of the invention may include the provision of such RF readers to each of the goods recipients so that they also may access the host computer to be assured they are receiving the correct type and quantity of goods to facilitate payment therefore.

An important feature of the invention as defined herein, as indicated, is the fact that each of these RF devices may be re-programmed following completion of delivery to the desired recipients, once these are returned to the shipping warehouse or the like for such re-programming.

The invention as defined herein is thus understood to be made from conventional materials and is of relatively simple construction so as to assure reduced cost in its manufacture and utilization. The device may be reused several times to thus further reduce costs. The invention as defined herein provides for the quick and efficient tracking of goods of many different types such that these goods are correctly stored (if desired) and distributed to designated recipients such as purchasing customers. The invention assures that by use of its encoded readable codes that theft, tampering, misplacement, etc., are substantially eliminated. Further, the invention as defined herein uses RF technology and the several advantages (especially wireless operation) associated therewith. Still further, it is understood from the teachings that the invention is relatively inexpensive to build, and relatively simple to operate and maintain.

While there have been shown and described what are at present the preferred embodiments of the invention, it will be obvious to those skilled in the art that various changes and modifications may be made therein without departing from the scope of the invention as defined by the appended claims.

What is claimed is:

1. An RF device for tracking goods, said device comprising:
   a metallic body portion including a metallic protruding pin segment;
   a printed circuit board positioned entirely within said body portion;
   at least one semiconductor chip positioned on and electrically coupled to said printed circuit board;

an antenna positioned on and electrically coupled to said substrate printed circuit board;

a plastic cover positioned on said body portion and for covering said at least one semiconductor chip and said antenna, said metallic protruding pin segment adapted for being inserted within a good for being shipped so as to securedly position said RF device on said good.

2. The device of claim 1 wherein said printed circuit board is of substantially annular configuration.

3. The device of claim 1 wherein said antenna comprises a continuous wire positioned on said printed circuit board and electrically coupled to said semiconductor chip.

4. The device of claim 1 further including a power regulator for regulating power of said device, said power regulator positioned on and electrically coupled to said printed circuit board.

5. The device of claim 4 wherein said cover also covers said power regulator.

6. The invention of claim 1 wherein said device is further adapted for being re-programmed following individual usage thereof and is thus reusable.

7. The device of claim 1 wherein said body portion is comprised of plastic.

8. The device of claim 1 wherein said metal of said protruding end segment is stainless steel.

* * * * *